United States Patent [19]

Elesh

[11] Patent Number: 5,351,648
[45] Date of Patent: Oct. 4, 1994

[54] PET PERCH FOR ATTACHMENT TO A WINDOW SILL

[75] Inventor: James N. Elesh, Evanston, Ill.

[73] Assignee: Flexi-Mat Corporation, Chicago, Ill.

[21] Appl. No.: 6,462

[22] Filed: Jan. 21, 1993

[51] Int. Cl.$^5$ .............................................. A01J 1/00
[52] U.S. Cl. .................................................. 119/28.5
[58] Field of Search ................ 119/28.5, 96, 101, 102, 119/103; 5/10.1, 187, 310, 201

[56] References Cited

U.S. PATENT DOCUMENTS

| | | | |
|---|---|---|---|
| 1,575,241 | 3/1926 | Williams | 5/10.1 |
| 2,499,103 | 2/1950 | Love | 119/28.5 X |
| 4,911,106 | 3/1990 | Goodwin | 119/96 X |
| 5,009,196 | 4/1991 | Young | 119/96 X |
| 5,072,694 | 12/1991 | Haynes et al. | 119/19 |

FOREIGN PATENT DOCUMENTS 930936  7/1963  United Kingdom ............... 119/28.5

OTHER PUBLICATIONS

The product shown in attached photograph "A", which is manufactured by Flexi-Mat Corporation, Chicago, Ill.

The product shown in attached photograph "B", which is manufactured by Hobar Mfg., Inc., Leicester, Mass.

The product shown in attached photograph "C", which is manufactured by Cat Craft Company, Canton, Ga.

Primary Examiner—Gene Mancene
Assistant Examiner—Thomas Price
Attorney, Agent, or Firm—Laff, Whitesel, Conte & Saret

[57] ABSTRACT

A pet perch for attachment to a window sill or other support surface comprises a generally rectangular frame defining a central opening, and a jacket for encasing the frame and covering the opening to provide a soft, hammock-like pet resting area. A pair of adjustable mounting brackets secures the frame to the window sill. The brackets engage channels formed in the undersides of the frame and two series of first holes extending along opposite sides of the frame. The series of first holes provide alternative fastening locations, so that the perch can be used with different depth window sills.

19 Claims, 3 Drawing Sheets

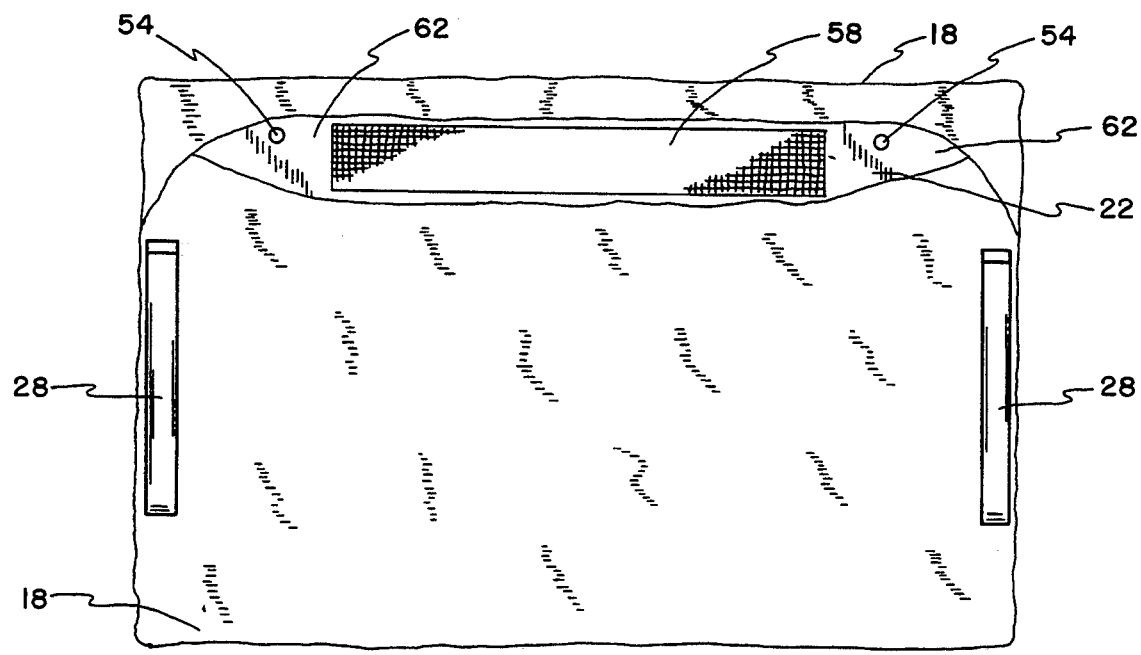
FIG. 6
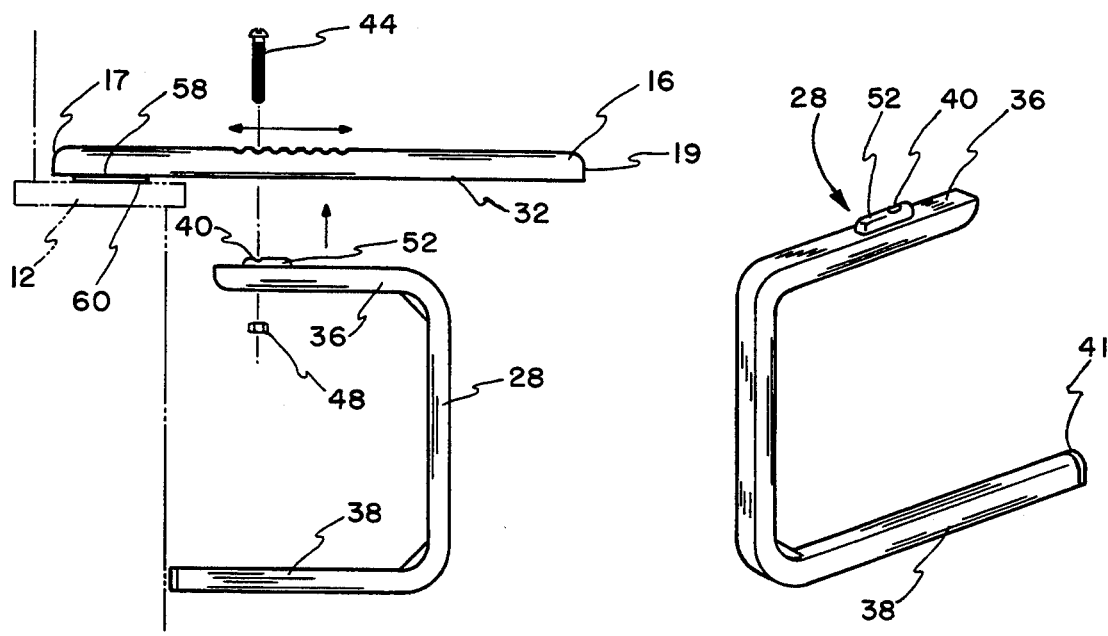
FIG. 3
FIG. 3a

PET PERCH FOR ATTACHMENT TO A WINDOW SILL

The present relates to a perch for pets, particularly for cats, to be located adjacent to a window.

BACKGROUND

Domestic cats typically enjoy spending large amounts of time on window sills staring at the outside world. Since window sills tend to be very narrow, however, it is known to construct perches adjacent to the windows to provide additional area for cats to relax while staring outside. The perches usually comprise hard, flat, rectangular surfaces that are covered with carpet or fabric.

Additionally, various means for securing perches to the sills of windows have been developed. For example, one product currently on the market employs a pair of L-shaped brackets that are mounted to the bottom of the perch, and two series of holes formed at the front end of the perch adjacent to the window and on opposite sides of the perch. The free ends of the L-shaped brackets abut the wall underneath the window sill to provide one means of support, and a second means of support is provided in the form of fasteners, which are inserted through one of the holes in each series and anchored to the window sill. The series of holes are employed to provide alternative locations for the fastening of the perch to the window sill because window sills come in different depths (i.e. the distance from the wall to the end of the window sill).

Another product on the market uses a single U-shaped bracket mounted to the bottom of the perch near its center, and hook and loop fastening means (i.e. Velcro). One of the legs of the U-shaped bracket is longer than the other and its end abuts the wall underneath the window sill to provide one means of support. The hook and loop fastening means comprises three sets of mating pads that are affixed to the window sill and underneath the perch near its leading edge, providing further means of support.

Although these products are generally adequate and enjoyed by cats, the perches tend to be uncomfortable because they are hard, flat surfaces- Additionally, window sills come in varying size and, depending on the particular window sill, the perches can be difficult to attach because the brackets mounted to the bottom of the perch are not adjustable.

Accordingly, it is an object of this invention to provide a perch for attachment to a window sill, window casement, or other support surface, and which provides a resting surface that is softer and more comfortable for cats than the heretofore known perches.

It is a further object of this invention to provide a perch having adjustable bracket means for easily mounting the perch to the window sill.

It is a still further object of this invention to provide a perch that can be either permanently mounted or releasably mounted to the window sill.

SUMMARY

In accordance with these and other objects, a pet perch for window mounting is provided comprising a frame defining an opening larger in width and length than a typical house cat, and a jacket for encasing the frame and covering the opening to provide a soft, hammock-like effect. In its preferred embodiment, the frame is generally square or rectangular and constructed of a lightweight material, such as plastic, and the jacket is constructed of a soft, lightweight material such as synthetic fleece. The opening is also generally rectangular or square.

Although the perch can be secured adjacent to the window in any suitable manner, in its preferred embodiment, the invention also includes an adjustable means for securing the frame to the window sill, which comprises a pair of U-shaped mounting brackets and two series of first holes extending along opposite sides of the frame. Each of the mounting brackets comprises first and second legs, with the first leg being shorter than the second leg. The end of each second leg is flat and abuts the wall underneath the window sill to support the perch.

Each first leg is fastened to the frame by a screw or the like that extends through one of the first holes in the frame and the aperture, and punctured through the jacket between the frame and the aperture. The series of first holes on opposite sides of the perch provide alternative locations for the fastening of the frame to the mounting brackets, so that the perch can be used with window sills having various depths.

Additionally, a pair of channels are formed on the bottom of opposite sides of the frame underneath each series of first holes, and an elongated boss is formed on the top side of each first leg at the aperture. The shapes of the elongated boss and U-shaped channels formed on the sides of the frame are complimentary, so that the bosses can be received by and slidingly engage the channels through the jacket. This construction allows the brackets to be easily and slidably moved to the desired location along the frame prior to fastening.

The securing means may further comprise means for attaching the leading edge of the frame to the window sill. With this embodiment, a ledge is provided that extends substantially along the length of the leading edge of the frame. A plurality of second holes are formed in the ledge and a plurality of fasteners are provided for inserting through the second holes and anchoring to the window sill with the use of a drill or the like. Additionally or alternatively, hook and loop fastening means may be provided on the window sill and the bottom of the ledge to releasably secure the frame to the window sill. Thus, depending on the embodiment of the invention employed, the perch may be either permanently or temporarily mounted to the window sill.

The present invention and advantages thereof will become more apparent upon consideration of the following detailed description when taken in conjunction with the accompanying drawings.

BRIEF DESCRIPTION OF THE DRAWINGS

FIG. 3 is a side, exploded view of the frame of the perch of FIG. 2 and one of the adjustable mounting brackets, illustrating adjustable means for securing the brackets to the frame.

FIG. 3A is a perspective view of the mounting bracket shown in FIG. 3.

FIG. 6 is a bottom plan view of the frame and jacket of the perch of FIGS. 1-3.

DETAILED DESCRIPTION OF THE PREFERRED EMBODIMENTS

Figure 1:
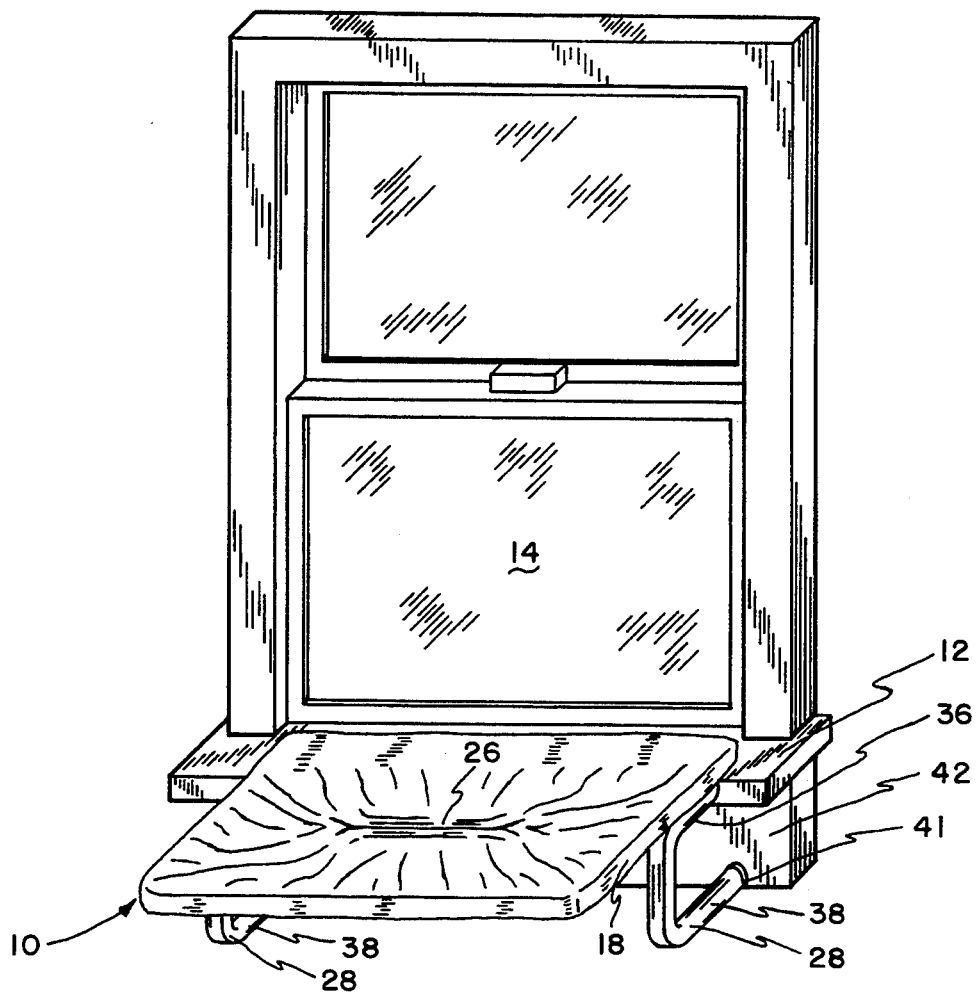
FIG. 1 is a perspective view of a perch in accordance with one embodiment of the invention shown secured to a window sill.
Figure 2:
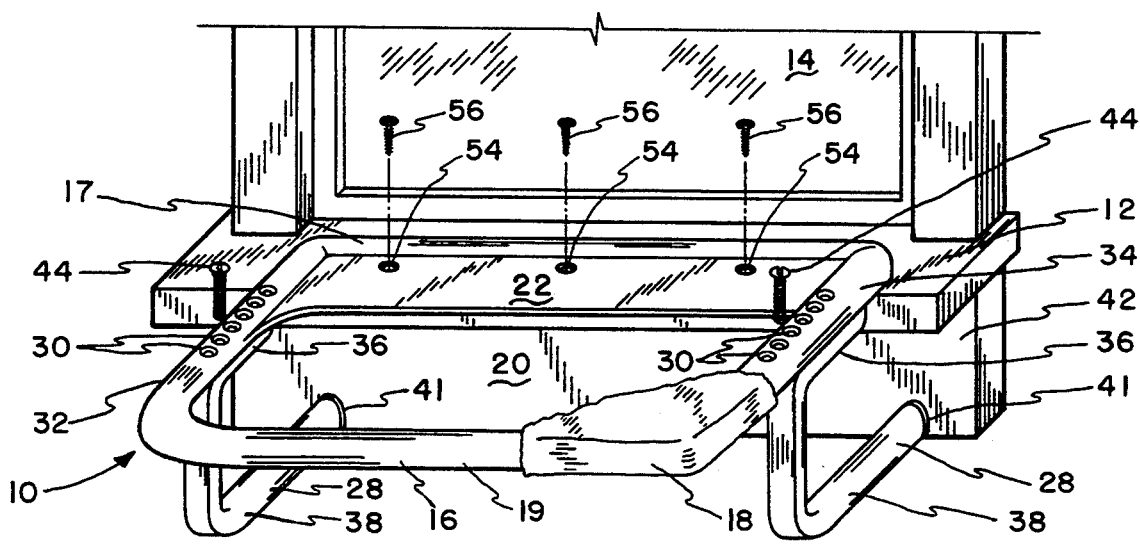
FIG. 2 is a broken and exploded view of the window perch of FIG. 1, illustrating means for securing the perch to the window sill.

A perch 10 in accordance with one embodiment of the invention is shown secured to the sill 12 of a window 14 in FIGS. 1-2. With this embodiment, the perch 10 comprises generally a frame 16 and a jacket 18 encasing the frame. The frame 16 is generally rectangular or square, has a front 17, a back 19, and two opposing sides 32, 34, and defines a relatively large central opening 20 that also is generally rectangular or square (see FIGS. 4 and 5). An elongated rectangular ledge 22 is formed along the front 17 of the frame. The frame 16 is constructed of any material that preferably is lightweight such as plastic. U-shaped channels 24 may be formed on the bottom of the sides 32, 34 frame (FIG. 5), which may reduce the weight and manufacturing costs of the frame.

The jacket 18 preferably is constructed of a soft, lightweight, washable material, such as synthetic fleece, and the opening 20 is covered by a portion of the jacket to provide a soft, hammock-like resting area 26 for a cat. As shown in FIG. 1, the resting area 26 over opening 20 sags as a result of the construction, particularly when a cat rests on area 26. As shown best in FIG. 6, the jacket 18 has an envelope construction so that the jacket 18 substantially fully encloses the frame. It is not necessary that a jacket 18 be employed to achieve the hammock-like effect in accordance with the invention; the same effect can be accomplished by covering the opening 20 across either the top or bottom of the frame with a sheet of fabric or other flexible webbing.

Although the perch 10 can be secured to the window sill 12 in any suitable manner, in its preferred embodiment, the invention also includes an adjustable means for securing the frame 16 to the window sill 12, which comprises a pair of U-shaped mounting brackets 28 and two series of first holes 30 extending along opposing sides 32, 34 of the frame (see FIGS. 2, 3 and 3A). Each of the mounting brackets 28 comprises first and second legs 36, 38, with the first leg being shorter than the second leg and having an aperture 40. The end 41 of each second leg 38 is flat and abuts the wall 42 underneath the window sill 12 to support the perch 10.

Figure 4:
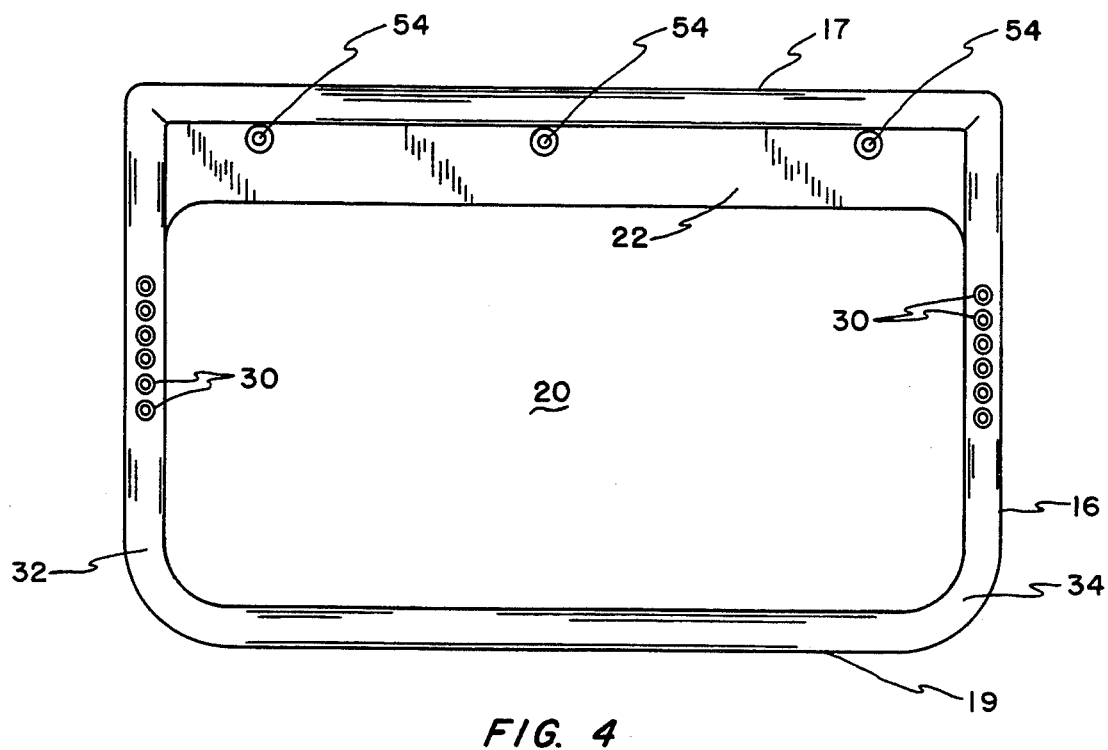
FIG. 4 is a top plan view of the frame of the perch shown in FIGS. 1-3.
Figure 5:
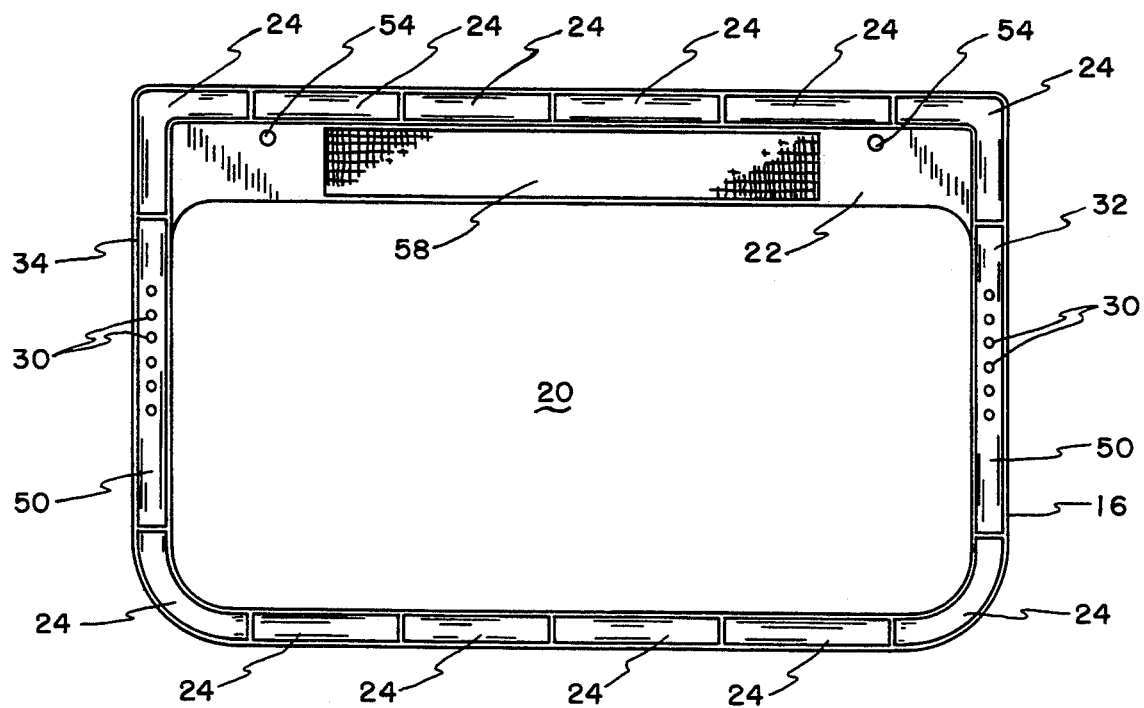
FIG. 5 is a bottom plan view of the frame of FIG. 4.

Each first leg 36 is fastened to the frame 16 by a screw 44 that extends through the aperture 40 and one of the first holes 30, and a nut 48. The screw 44 is also punctured through the jacket 18 between the frame 16 and the aperture 40. The series of first holes 30 on opposing sides 32, 34 of the perch 10 provide alternative locations for the fastening of the frame 16 to the mounting brackets 28, so that the location of the brackets can be adjusted and the perch 10 can be used with window sills having various depths. If desired, the first holes 30 may be counterbored as shown in FIGS. 2 and 4.

Additionally, a pair of U-shaped channels 50 are formed on the bottom of opposite sides of the frame 16 underneath each series of first holes 30, and an elongated boss 52 is formed on the top side of each first leg 36 around the aperture 40. The shapes of the elongated boss 52 and U-shaped channels 50 formed on the sides of the frame 16 are complimentary, so that the bosses are received by and slidingly engage the channels.

The means for securing the frame 16 to the window sill 12 may also include means for attaching the ledge 22 to the window sill 12. The attachment means may comprise a plurality of second holes 54 formed in the ledge 22, and a plurality of fasteners 56 inserted through the second holes and secured to the top of the window sill 12 through the use of a drill or the like. If desired, the second holes 54 may be counterbored as shown in FIGS. 2 and 4.

The attachment means may instead comprise hook and loop fastening means (i.e. Velcro) in the form of a pair of mating pads 58, 60 affixed to the window sill 12 and the bottom of the ledge 22 by any suitable adhesive. The hook and loop fastening means allows the perch 10 to be attached or removed quickly and easily. It is appreciated, however, that the hook and loop fastening means and second holes and fasteners can be used together. Desirably, a gap 62 is formed in the jacket 18 underneath the ledge 22 to accommodate the fasteners and/or one of the hook and loop pads 58, 60 (FIG. 6), and also to allow insertion and removal of the frame 16 when the jacket 18 requires cleaning.

The foregoing description is for purposes of illustration only and is not intended to limit the scope of protection accorded this invention. The scope of protection is to be measured by the following claims, which should be interpreted as broadly as the inventive contribution permits.

The claimed invention is:

1. A pet perch for securing to a support surface comprising:
   a frame defining an opening;
   a webbing supported by the frame and covering the opening, the webbing defining a pet resting area; and
   securing means comprising at least one mounting bracket, the mounting bracket being generally U-shaped and having first and second legs, the first leg being engageable with the frame at alternate locations for adjustably spacing the perch from the support surface, the second leg abutting the support surface.

2. The perch of claim 1 wherein the webbing is comprised of a fabric.

3. The perch of claim 1 wherein the webbing is comprised of synthetic fleece.

4. The perch of claim 1 wherein the webbing is comprised of a flexible material.

5. The perch of claim 1 wherein the webbing substantially encases the frame.

6. The perch of claim 1 wherein the frame is generally rectangular.

7. The perch of claim 1 wherein the opening is generally rectangular.

8. The perch of claim 1 wherein a first channel is formed in the frame for receiving the mounting bracket.

9. The perch of claim 8 further including a second mounting bracket, and a second channel in the frame for receiving the second mounting bracket.

10. The perch of claim 9 wherein the securing means comprises hook and loop fastening means, the hook and loop fastening means comprising two mating pads, the first pad being affixed to the frame, and the second pad being affixed to the support surface.

11. The perch of claim 10 wherein a ledge is formed on the frame parallel to the support surface, and wherein the first mating pad is affixed to the ledge.

12. A pet perch to be mounted to a window sill and the wall adjoining it comprising:
- a frame having a front, back, and two sides and defining a central opening;
- a fabric sheet substantially encasing a substantial portion of the frame and covering the opening, the fabric sheet defining a pet resting area within the frame; and
- a pair of U-shaped mounting brackets adjustably affixed to opposing sides of said frame, said mounting brackets for abutting said wall while said frame rests on said window sill.

13. The pet perch of claim 12 wherein said fabric sheet sags within said central opening to provide a hammock-like resting area.

14. The pet perch of claim 12 and a ledge formed along the front of said frame for securing to said window sill.

15. The pet perch of claim 14 wherein said central opening extends between said two sides of said frame and between said ledge and said back of said frame.

16. A pet perch comprising:
- a frame having two opposing sides, a front, and a back and defining an opening, the frame further having a channel extending along each side;
- a fabric jacket substantially encasing a substantial portion of the frame and covering the opening, the fabric jacket defining a pet resting area;
- means for securing the frame to a support surface, the securing means comprising a pair of mounting brackets engageable with the channels of the frame, and abutting the support surface.

17. The perch of claim 16 wherein the securing means further comprise two series of first holes formed in the frame on opposite sides of the frame, and the mounting brackets are generally U-shaped and have first and second legs, the first leg being engageable with one of the channels and having an apertured, elongated boss receivable in the channel, and fasteners for attaching the mounting brackets to the frame through a selected one of the first holes of each series and a boss aperture, the elongated boss being receivable in the channel through the jacket.

18. The perch of claim 17 wherein the frame further comprises a ledge extending along the front side of the frame.

19. The perch of claim 18 further comprising means for attaching the ledge to the support surface.

* * * * *